United States Patent
Ishida et al.

(10) Patent No.: US 8,120,821 B2
(45) Date of Patent: Feb. 21, 2012

(54) IMAGE SCANNING DEVICE COMPRISING A FLATBED SCANNER UNIT AND A CASING WITH A STOPPER ACCOMMODATING PORTION

(75) Inventors: Kazuhito Ishida, Ichinomiya (JP); Yoshinori Osakabe, Seto (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1002 days.

(21) Appl. No.: 11/669,476

(22) Filed: Jan. 31, 2007

(65) Prior Publication Data
US 2007/0177226 A1    Aug. 2, 2007

(30) Foreign Application Priority Data
Feb. 1, 2006   (JP) .................................. 2006-025102

(51) Int. Cl.
*H04N 1/04* (2006.01)
(52) U.S. Cl. ........................................ 358/474; 358/401
(58) Field of Classification Search .................... 358/474
See application file for complete search history.

(56) References Cited

U.S. PATENT DOCUMENTS

| | | | |
|---|---|---|---|
| 4,040,615 A | 8/1977 | Kurosaki | |
| 2002/0061212 A1 | 5/2002 | Tanaka | |
| 2003/0056324 A1 | 3/2003 | Yazawa et al. | |
| 2005/0134940 A1 | 6/2005 | Shyu | |
| 2005/0151782 A1* | 7/2005 | Ishida et al. | 347/37 |
| 2005/0206667 A1* | 9/2005 | Ohama et al. | 347/9 |
| 2006/0000056 A1 | 1/2006 | Connors et al. | |
| 2006/0029424 A1* | 2/2006 | Kawai et al. | 399/125 |

FOREIGN PATENT DOCUMENTS

| | | |
|---|---|---|
| EP | 1289250 A | 3/2003 |
| JP | H09-044947 A | 2/1997 |
| JP | H09-244759 A | 9/1997 |
| JP | 2003-3093658 U | 2/2003 |
| JP | 2006-044061 A | 2/2006 |

OTHER PUBLICATIONS

English Machine Translation of Japanese Publication No. 2003-3093658 Brother Indus Ltd.*
European Patent Office, European Search Report for Related Application No. EP 07250418, dated Aug. 7, 2007.

* cited by examiner

*Primary Examiner* — Benny Tieu
*Assistant Examiner* — Marcellus Augustin
(74) *Attorney, Agent, or Firm* — Baker Botts L.L.P.

(57) ABSTRACT

An image scanning device includes: a main body that has a box-shaped appearance having a front face and a back face; a flat bed scanner unit that is mounted on the main body to be rotatable around an axis provided near the back face along a width direction of the main body; and a stopper that supports the flat bed scanner unit in an opened state. The stopper includes: a base end that is rotatably attached to an upper portion of the main body; and a leading end that is slidably attached to the flat bed scanner unit. A casing of the flat bed scanner is provided with a stopper accommodating portion that is recessed from a bottom surface of the casing. The stopper accommodating portion accommodates the stopper above the bottom surface in a closed state where the flat bed scanner unit is closed.

12 Claims, 15 Drawing Sheets

IMAGE SCANNING DEVICE COMPRISING A FLATBED SCANNER UNIT AND A CASING WITH A STOPPER ACCOMMODATING PORTION

CROSS-REFERENCE TO RELATED APPLICATION

This application claims priority from Japanese Patent Application No. 2006-025102, filed on Feb. 1, 2006, the entire subject matter of which is incorporated herein by reference.

TECHNICAL FIELD

Aspects of the present invention relate to an image scanning device that is provided with a main body and a flat bed scanner unit that is mounted in the main body to be opened and closed with respect to the main body.

BACKGROUND

A device has been so far commercially available, which is available to perform a plurality of functions for printing, scanning, copying and faxing. The device with a plurality of functions is generally called a "Multi-Function Device."

The multi-function device is provided with an image forming section which forms images on a sheet in order to provide functions for printing, copying, and faxing. The multi-function device is also provided with an image scanning section for scanning images of a document (original) in order to provide functions for scanning and copying.

The image scanning section is embodied as a flat bed scanner, for example. The image scanning section may also be provided with an auto document feeder (hereinafter, referred to as ADF) for automatically feeding documents to the flat bed scanner. The flat bed scanner is provided with a scanning platform having a platen glass arranged on an upper face and a cover that covers the upper face of the scanning platform. Documents subjected to the scan are placed on the platen glass. The cover is closed with respect to the scanning platform, by which the documents are pressed toward the platen glass. An image sensor is provided inside the scanning platform so as to move back and forth along the platen glass. The image sensor converts the images scanned from the documents into electrical signals.

In the multi-function device, the image scanning section is generally arranged at an upper part of the image forming section, in order to let the documents be easily set on the platen glass for performing the scan by the flatbed scanner. The image forming section requires operational maintenance such as a care for a paper jam and an exchange of an ink cartridge. In order to access an inner part of the image forming section for conducting the operational maintenance, a casing of the image forming section needs to be partially opened. Accordingly, a mechanism is adopted for allowing the image scanning section be opened and closed with respect to the image forming section.

During the operational maintenance, it is desirable that the image scanning section should be kept open with respect to the image forming section. Accordingly, a stopper is provided in the image scanning device for supporting the image scanning section in the opened state. An example of this configured image scanning device is disclosed in a Japanese Utility Model Registration No. 3093658 (JP-3093658-Y). The stopper is disclosed as a "scanner stand" in the document JP-3093658-Y.

As described above, in view of an operational convenience, the image scanning section and the image forming section are vertically arranged, with the image scanning section positioned above the image forming section. In the multi-function device having a plurality of functions, functional units such as the image scanning section and the image forming section are combined, which may easily result in a larger size of the device. In order to save office space and attain effective use of a desktop space, it is desired to configure the multi-function device smaller and thinner.

In a configuration where the stopper is provided, it is desirable in making the device smaller and thinner to accommodate the stopper into an empty space when the image scanning section is closed.

It is assumed that the scanning platform is recessed at the bottom face in order to provide a space for accommodating the stopper on the scanning platform of the image scanning section. In order to form the recess, a projection corresponding to the recess is formed inside the scanning platform. More specifically, the bottom plate of the scanning platform is recessed inward. However, a face inside the bottom plate of the scanning platform is visible to a user through a platen glass when the image scanning section is used. Therefore, a bottom plate having the recess and the projection will spoil the appearance of the image scanning device. In other words, a user will have an impression that the above-configured device is devoid of sophisticated quality or design consideration.

Further, when an image scanning section is closed with respect to an image forming section, the weight of the image scanning section is added to the force of a user for closing the image scanning section, thereby there is a risk that the image scanning section may have an abrupt rotational movement. It is not desirable that the image scanning section has an abrupt rotational movement in view of safety. Further, an impact on closing of the image scanning section may disengage or damage members. On the other hand, when a damper is used to apply a load to the rotational movement of the image scanning section, a larger force is needed in opening the image scanning section with respect to the image forming section. Mounting an air damper will result in an increased production cost and a larger size of the device.

SUMMARY

According to an aspect of the present invention, there is provided an image scanning device including: a main body that has a box-shaped appearance having a front face and a back face that opposes to the front face; a flat bed scanner unit that is mounted on the main body to be rotatable around an axis provided near the back face along a width direction of the main body, the flat bed scanner unit being provided with a casing and an image sensor that moves in the width direction to scan an image of a document placed on a scanning area; and a stopper that supports the flat bed scanner unit in an opened state where the flat bed scanner unit is opened with respect to the main body by being rotated around the axis. The stopper has: a base end that is rotatably attached to an upper portion of the main body; and a leading end that is slidably attached to the flat bed scanner unit. The casing is provided with a stopper accommodating portion that is recessed from a bottom surface of the casing, the stopper accommodating portion accommodating the stopper above the bottom surface in a closed state where the flat bed scanner unit is closed with respect to the main body.

DESCRIPTION

Hereinafter, a description will be made for examples of the present invention with reference to the drawings.

Figure 1:
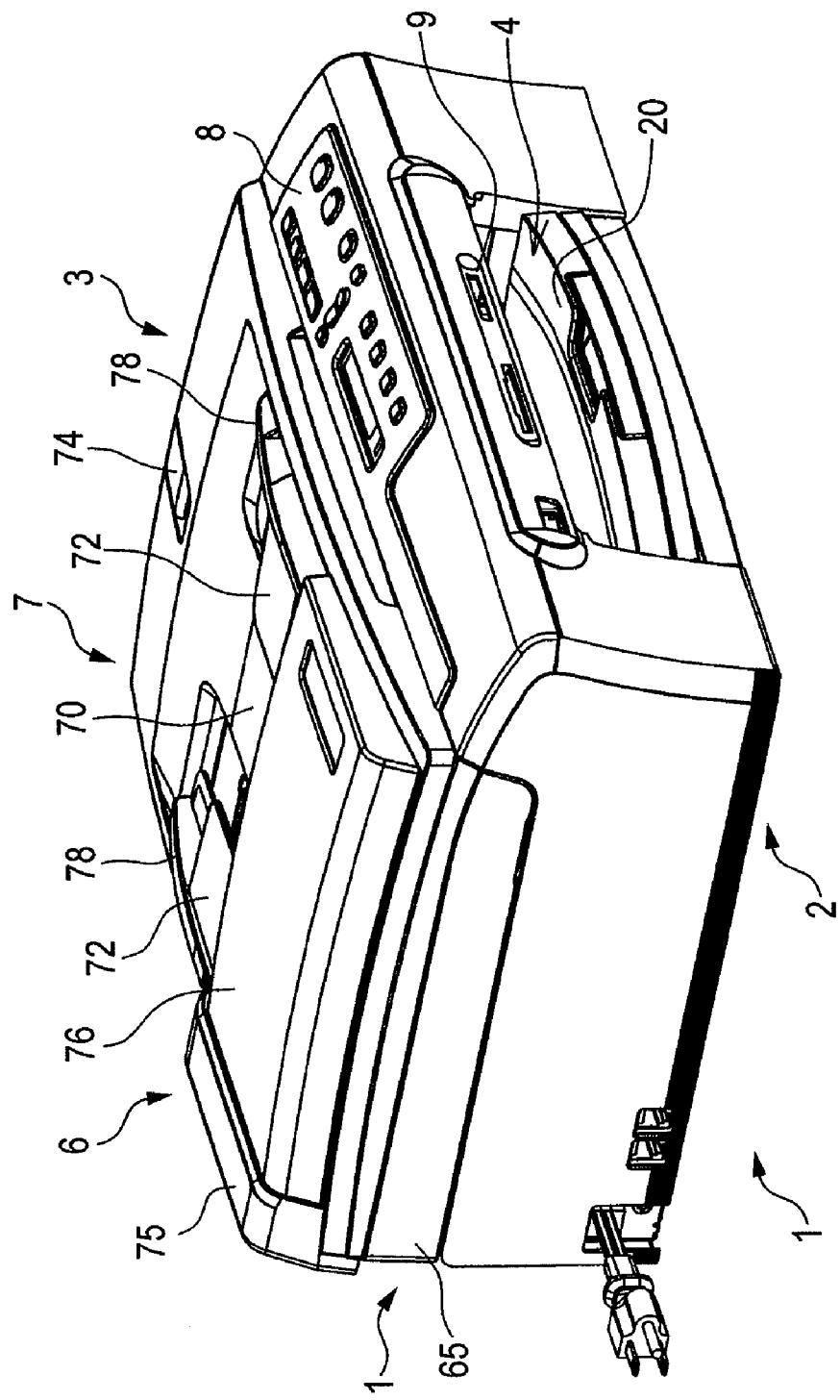
FIG. 1 is a perspective view showing an appearance of a multifunction device according to an example of the present invention.

FIG. 1 illustrates an appearance of a multi-function device 1 as an example of an image scanning device according to the present invention. The multi-function device 1 is an MFD (multi-function device) having a printer unit 2 at a lower part and a flat-bed scanner unit 3 (hereinafter, referred to as FBS unit) at an upper part. The printer unit 2 and the FBS unit 3 provide a plurality of functions for printing, scanning, copying and faxing.

When performing the printing function, the multi-function device 1 is mainly connected to a computer (not shown), and the printer unit 2 forms images on a sheet on the basis of image data and document data sent from the computer. The printer unit 2 forms on the sheet the image data output from external equipment such as a digital camera connected to the multi-function device 1. The printer unit 2 forms on the sheet the image data stored in various types of storage media such as a memory card inserted into the multi-function device 1.

When performing the scanning function, image data of documents (scanned original) read by the FBS unit 3 is sent to the computer. The image data may be stored in various types of storage devices such as a memory card. When performing the copying function, image read by the FBS unit 3 is formed on a sheet by the printer unit 2. When performing the facsimile function, image read by the FBS unit 3 is faxed through a communication line connected to the multi-function device 1. The multi-function device 1 receives facsimile data sent through the communication line and forms an image included in the received data on a sheet by the printer unit 2.

Figure 2:
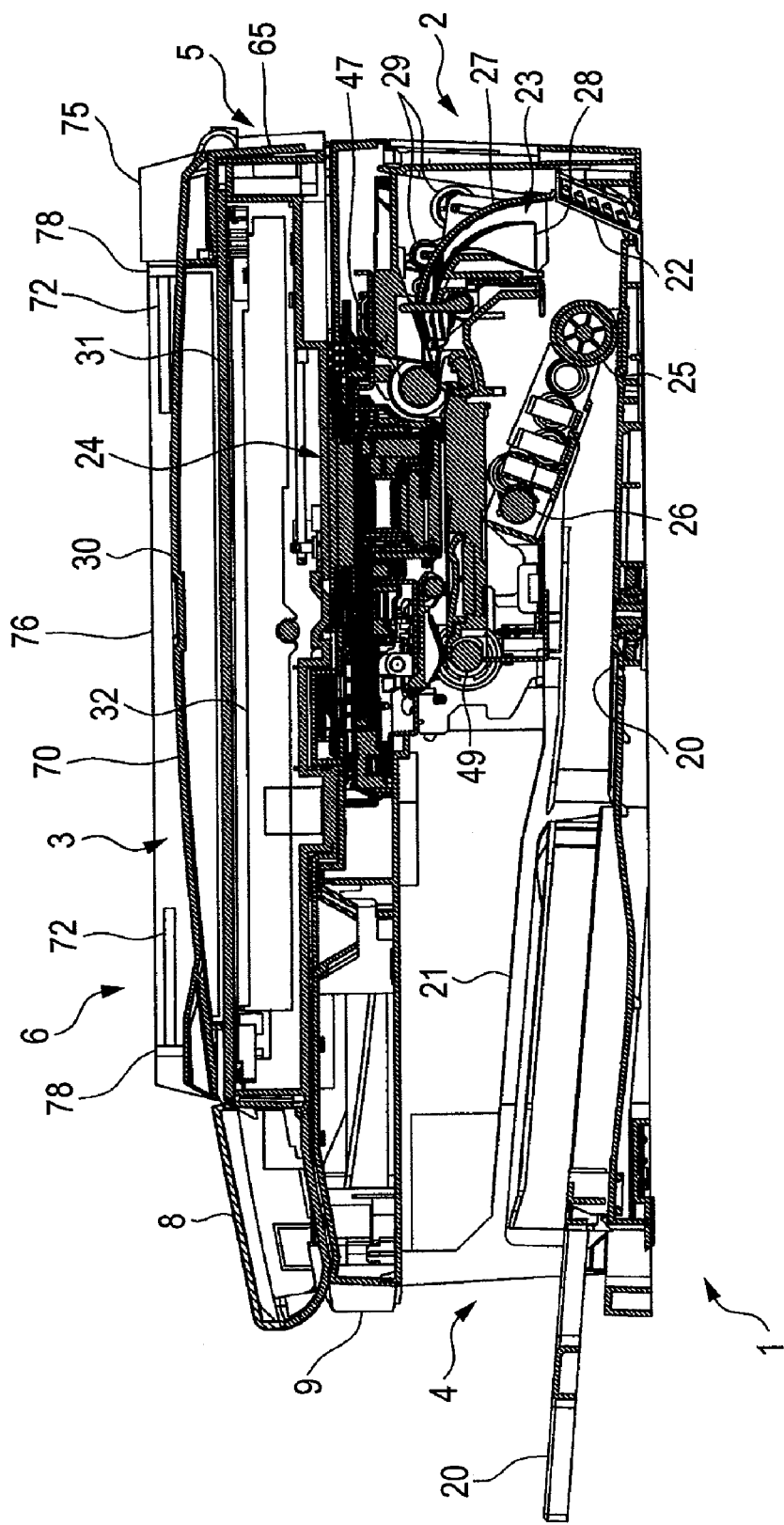
FIG. 2 is a sectional view showing an inner configuration of the multi-function device.

Hereinafter, a description will be made for a configuration of the printer unit 2. FIG. 2 is a longitudinal sectional view showing an inner configuration of the multi-function device 1. As shown in FIGS. 1 and 2, an opening 4 is formed on a front face of the multi-function device 1. A sheet feeding tray 20 and a sheet discharging tray 21 are attached to the multi-function device 1 through the opening 4. In FIG. 1, the sheet discharging tray 21 is not shown because the sheet discharging tray 21 is placed deep inside the opening 4 and not visible from outside.

A sheet feeding tray 20 accommodates sheet (recording medium) in arbitrary sizes such as A4-size or B5-size. A sheet discharging tray 21 is supported by the sheet feeding tray 20 and arranged above the sheet feeding tray 20. The sheet feeding tray 20 and the sheet discharging tray 21 are attached to the multi-function device 1 in a state where the sheet discharging tray 21 is stacked above the sheet feeding tray 20.

An inclined separator 22 is disposed deep inside the sheet feeding tray 20. The inclined separator 22 separates a sheet fed out from the sheet feeding tray 20 and guides the sheet upward.

A sheet feeding path 23 is formed above the inclined separator 22. The sheet feeding path 23 bends from above the inclined separator 22 to the front face of the multi-function device 1, and thereafter, extends from the back face of the multi-function device 1 to the front face thereof, further guiding to the sheet discharging tray 21 through the lower part of an image forming section 24. Sheet fed out from the sheet feeding tray 20 is guided by the sheet feeding path 23 so as to make a U-turn from below to above, and brought up to the image forming section 24. Images are formed by the image forming section 24 on the sheet, which is then discharged to the sheet discharging tray 21.

A sheet feeding roller 25 is provided above the sheet feeding tray 20. The sheet feeding roller 25 separates the sheet loaded on the sheet feeding tray 20 one by one, to thereby feed the sheet to the sheet feeding path 23. The sheet feeding roller 25 is axially supported at the leading end of a sheet feeding arm 26 that moves vertically so as to touch on or off the sheet feeding tray 20. The sheet feeding roller 25 is rotated by a motor (not shown).

A sheet feeding arm 26 is disposed so as to move in a swinging manner in a vertical direction, while a base end part thereof being serves as an axis of the swing. The sheet feeding arm 26 is lowered so that the sheet feeding roller 25 is allowed to make a pressure contact with the sheet feeding tray 20 in a state that the sheet feeding tray 20 is attached to the multi-function device 1. Where the sheet feeding tray 20 is removed from the multi-function device 1, the sheet feeding arm 26 is flipped upward by an urging force of an urging member such as a spring. When the sheet feeding arm 26 is lowered, the sheet feeding roller 25 axially supported by the leading end is allowed to make a pressure contact with the sheet on the sheet feeding tray 20. Where the sheet feeding roller 25 is rotated in this state, the upper-most sheet is fed out to the inclined separator 22 by a frictional force between the roller face of the sheet feeding roller 25 and the sheet. The sheet is guided upward, with the front end kept in contact with the inclined separator 22, and fed into the sheet feeding path 23. Even in a case where a sheet (second sheet) immediately below the subject sheet (upper-most sheet) is fed out together therewith by actions such as friction or static electricity, together with the upper most sheet fed out by the sheet feeding roller 25, the second sheet is in contact with the inclined separator 22 and prevented from being fed out.

The sheet feeding path 23 is configured by an outer guide face and an inner guide face which oppose each other at a predetermined interval except at areas as such where the image forming sections 24 are placed. For example, the sheet feeding path 23 on the back face of the multi-function device 1 is configured by an outer guide member 27 and an inner guide member 28 which are fixed within a frame. A feeding roller 29 is provided at a predetermined site on the sheet feeding path 23, in particular, at a site where the sheet feeding path 23 is bent. The feeding roller 29 is supported to the outer guide member 27 to rotate freely, with the width direction of the sheet feeding path 23 set axially, in such a way that the roller face is exposed from the outer guide face. The feeding roller 29 smoothly feeds the sheet which is in contact with the outer guide face at the area where the sheet feeding path 23 is bent.

Figure 3:
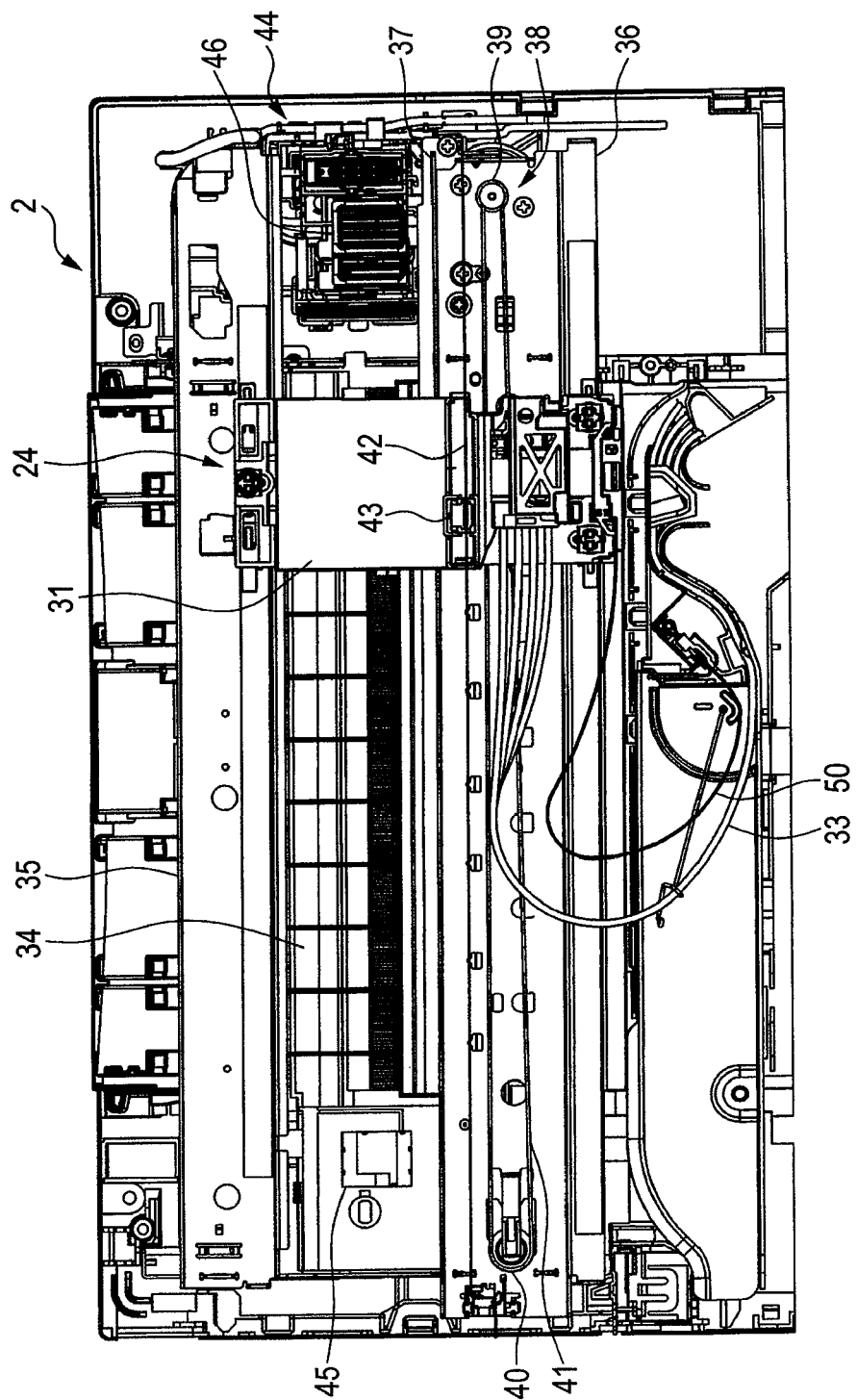
FIG. 3 is a plan view showing an inner configuration of a printer unit provided in the multi-function device.

FIG. 3 is a partial plan view showing an inner configuration of the printer unit 2. The image forming section 24 is provided with a head carriage 31 having a recording head and moves back and forth in a main scanning direction. The main scanning direction is defined as a direction parallel to the width direction of the sheet feeding path 23.

Various color inks of cyan (C), magenta (M), yellow (Y) and black (Bk) are supplied from an ink tank via an ink tube 33 to the recording head. Although not shown in FIG. 3, the recording head is exposed to the lower face of the head carriage 31, and ejects various colors of ink as fine ink particles from a nozzle. The head carriage 31 moves in a reciprocating manner, by which the recording head is scanned with respect to sheet, thereby images are formed on the sheet fed on a platen 34.

As shown in FIG. 3, a pair of guide rails 35, 36 are placed above the platen 34. The guide rails 35, 36 are isolated in the feeding direction of sheet and extended in the width direction of the sheet feeding path 23. The head carriage 31 is provided so as to slide along the guide rails 35, 36. The guide rail 35, which is disposed upstream in the feeding direction of sheet, is a flat plate in which the width direction of the sheet feeding path 23 is longer than the scanning width of the head carriage 31. The upper face of the guide rail 35 guides and supports the upstream end of the head carriage 31 so as to freely slide.

The guide rail 36, which is disposed downstream in the feeding direction of the sheet, is a flat plate in which the width direction of the sheet feeding path 23 is substantially the same in length as the guide rail 35. The upper face of the guide rail 36 guides and supports the upstream end of the head carriage 31 so as to freely slide. The upstream end 37 in the feeding direction of the rail 36 is bent substantially at a right angle. The head carriage 31 holds the end 37 of the guide rail 36 between a pair of rollers (not shown). Whereby, the head carriage 31 is held on the guide rails 35, 36 so as to freely slide and moves in a reciprocating manner along the width direction of the sheet feeding path 23 on the basis of the end 37 of the guide rail 36.

A belt driving mechanism 38 is placed on the upper face of the guide rail 36. The belt driving mechanism 38 includes: an endless annular timing belt 41 that is formed with teeth on inner surface thereof, and is stretched between a driving pulley 39; and a driven pulley 40 respectively provided near the both ends in the width direction of the sheet feeding path 23. A driving force is applied to the axis of the driving pulley 39 by a motor (not shown). When the driving pulley 39 is rotated, the timing belt 41 is circumferentially moved.

The head carriage 31 is fastened to the timing belt 41. The timing belt 41 is circumferentially moved, by which the head carriage 31 is moved on the guide rails 35, 36 in a reciprocating manner on the basis of the end 37. The recording head mounted on the head carriage 31 is also moved in a reciprocating manner, together with the head carriage 31, with the width direction of the sheet feeding path 23 defined as the main scanning direction. An encoder strip 42 of the linear encoder is disposed along the end 37 on the guide rail 36. The linear encoder detects the encoder strip 42 by using a photo interrupter 43 provided on the head carriage 31. The reciprocating movement of the head carriage 31 is controlled on the basis of detection signal output by the linear encoder.

As shown in FIG. 3, a platen 34 is disposed to vertically oppose the head carriage 31. The platen 34 is disposed along the central portion through which the sheet passes in a range of the reciprocating movement of the head carriage 31. The width of the platen 34 is sufficiently larger than the width of the sheet having largest size to be fed, and both ends of the sheet always pass over the platen 34.

A purge mechanism 43 and a waste ink tray 45 are disposed outside a range (image recordable range) that is available for forming an image by the recording head, the range through which sheet on both ends of the platen 34 do not pass. The purge mechanism 43 is to suck and remove bubbles and foreign particles, together with ink from a nozzle of the recording head. The purge mechanism 43 is provided with a cap 46 that covers the nozzle face of the recording head. The cap 46 is connected to a pump mechanism. Further, the cap 46 is allowed to touch on or off the nozzle face of the recording head by a moving mechanism. When bubbles on the recording head are sucked and removed, the head carriage 31 is moved in such a way that the recording head is positioned on the cap 46. In this state, the cap 46 is moved above and firmly attached so as to hermetically close the nozzle of the recording head. A pump connected to the cap 46 is then used to suck ink from the nozzle of the recording head.

The waste ink tray 45 is placed outside the image recording range of the head carriage 31 and on the opposite side of the purge mechanism 43. The waste ink tray 45 is to receive a void ejection of ink at the recording head. This void ejection is called flushing, The purge mechanism 43 and the waste ink tray 45 are configured as a maintenance unit that performs an operational maintenance such as the removal of bubbles and mixed-color ink inside the recording head.

Although not shown in FIG. 3, the printer unit 2 is provided with an ink tank. Ink is supplied from the ink tank via an ink tube 33 to the recording head of the head carriage 31. The ink tank is made up of four independent ink tanks each containing color ink of cyan (C), magenta (M), yellow (Y) or black (Bk).

Each of the ink tubes 33 is a tube made of a synthetic-resin and has flexibility so as to deform in accordance with the movement of the head carriage 31 when performing the scan. Four ink tubes 33 are provided for the corresponding four different color inks. Each of the ink tubes 33 is connected at an opening of one end to each of the ink tanks. Each of the ink tubes 33 is taken out along the width direction of the multi-function device 1 near the center and temporarily fixed to an appropriate member such as the device frame. Then, a portion from the fixed part to the head carriage 31 is not fixed to the device frame, but changes in posture following the reciprocating movement of the head carriage 31, More specifically, in accordance with the movement of the head carriage 31 to one end of the reciprocating movement (to the left in FIG. 3), each of the ink tubes 33 is deflected so that a bending radius of a U-shaped bent portion is made smaller and moved to the moving direction of the head carriage 31. On the other hand, in accordance with the movement of the head carriage 31 to the other end of the reciprocating movement (to the right in FIG. 3), each of the ink tubes 33 is deflected so that the bending radius of the bent side is made greater and moved to the moving direction of the head carriage 31.

As shown in FIG. 3, the head carriage 31 is connected to a flat cable 50. The flat cable 50 is connected to a control circuit board (not shown). Signals such as recording signals are sent from the control circuit board via the flat cable 50 to the recording head. The flat cable 50 is a thin band-shaped insulator prepared by covering an electric signal-sending conductor with a synthetic resin film such as polyester film. The flat cable 50 electrically connects the control circuit board with the control circuit board of the recording head. The flat cable 50 is taken out from the head carriage 31 toward the direction of reciprocating movement and bent vertically in a substantial U-shape. This substantially U-shaped portion is not fixed to other members and changes in posture following the reciprocating movement of the head carriage 31.

As shown in FIG. 2, a feeding roller 47 is provided upstream at the image forming section 24. Although not shown, a pinch roller that is allowed to make a pressure contact with a feeding roller 47 is provided below the feeding roller 47. The feeding roller 47 holds sheet between the pinch rollers, and feeds the sheet onto the platen 34. A paper discharging roller 49 is provided downstream at the image forming section 24. Although not shown, a pinch roller that is allowed to make a pressure contact with a paper discharging roller 49 is provided upstream at the sheet discharging roller 49.

The sheet discharging roller 49 holds the sheet which has been recorded between the pinch rollers, and feeds the sheet onto the sheet discharging tray 21. A driving force is transmitted to the feeding roller 47 and the sheet discharging roller 49 from a motor, whereby an intermittent driving is conducted at a predetermined line feed width. The rotation of the feeding roller 47 is synchronized with that of the sheet discharging roller 49. A rotary encoder detects an encoder disk provided at the feeding roller 47 by a photo interrupter, and the feeding roller 47 and the sheet discharging roller 49 are controlled for rotation on the basis of signals detected by the rotary encoder. The encoder disk and the photo interrupter are not shown in FIG. 2.

Figure 4:
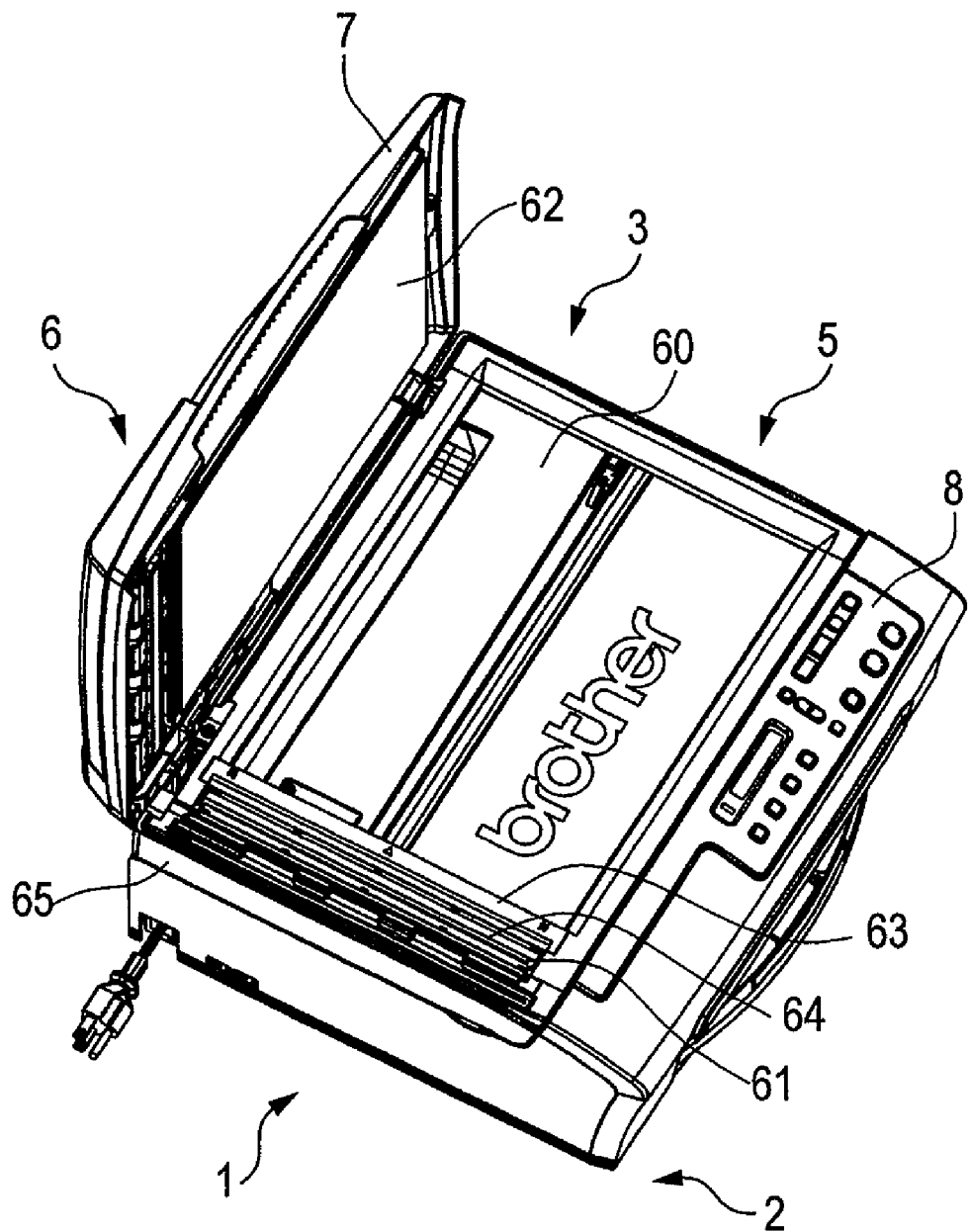
FIG. 4 is a perspective view showing an appearance of the multi-function device in a state where a cover is opened.

Hereinafter, a detailed description will be made for the configuration of an FBS unit 3. FIG. 4 is a perspective view showing an appearance of the multi-function device 1 in a state that a cover 7 is opened with respect to a scanning platform 5. As shown in FIG. 1 and FIG. 4, the FBS unit 3 is provided with the cover 7 attached so as to be freely opened or closed via a hinge on the back face with respect to the scanning platform 5 functioning as an FBS (flat bed scanner) The cover 7 is provided with an auto document feeder 6 (hereinafter, referred to as ADF). The ADF 6 is also opened or closed in association with the cover 7.

As shown in FIG. 4, a first platen glass 60 and a second platen glass 61 are disposed on the upper face of the scanning platform 5. As shown in FIG. 1, when the cover 7 is closed with respect to the scanning platform 5, the first platen glass 60 and the second platen glass 61 are covered by the cover 7. A pressing member 62 for pressing documents placed on the first platen glass 60 is provided on the lower face of the cover 7.

The first platen glass 60 provides a scanning area that is used for scanning when the FBS unit 3 is used as a flat-bed scanner. The second platen glass 61 provides a scanning area that is used for scanning when the ADF 6 provided in the FBS unit 3 is used for the scanning. The first platen glass 60 and the second platen glass 61 are made of, for example, transparent glass plates or acrylic plates. Therefore, the interior (bottom plate) of a casing 65 corresponding to the scanning area can be observed via the first platen glass 60 and the second platen glass 61.

A positioning member 63 is provided between the first platen glass 60 and the second platen glass 61. The positioning member 63 serves as a positioning reference used when documents are placed on the first platen glass 60. Markings that indicate an appropriate placing position for each of the documents having regular sizes such as A4-size and B5-size are provided on the upper face of the positioning member 63. The positioning member 63 also serves as a guide for returning the document passing on the second platen glass 61 to a sheet feeding path 23, in a case where the ADF 6 is used.

Figure 5:
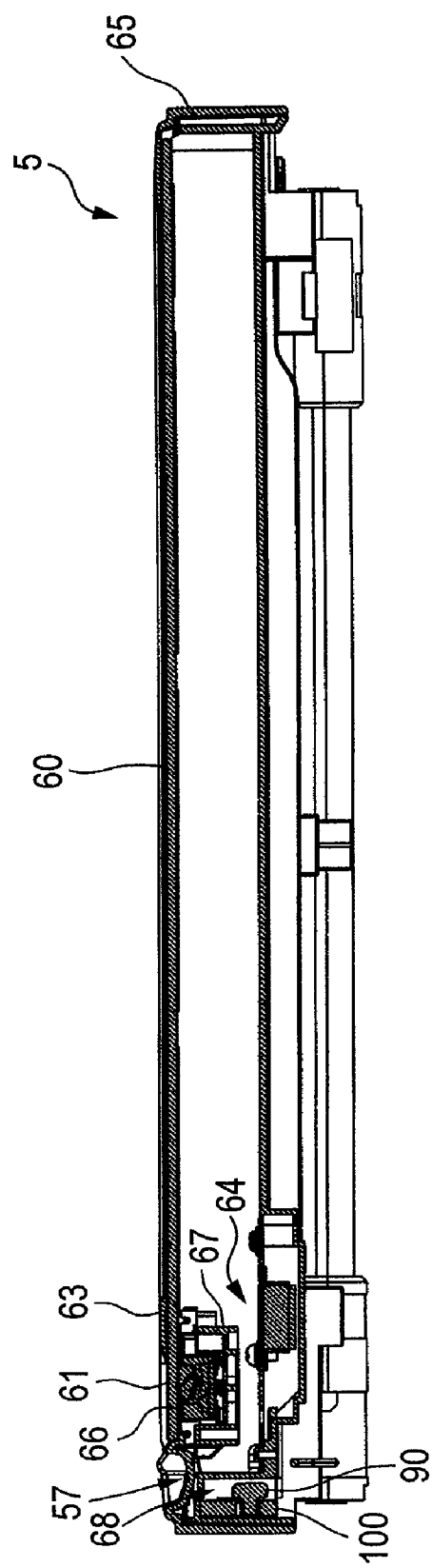
FIG. 5 is a sectional view showing an inner configuration of the scanning platform provided in the multi-function device.

FIG. 5 is a sectional view showing an inner configuration of the scanning platform 5. FIG. 5 illustrates a vertical cross section when observed from the width direction of the multi-function device 1 (direction from left below to right above in FIG. 4), and omits showing a part of the members such as the cover 7. As shown in FIG. 5, an image scanning unit 64 is disposed inside the scanning platform 5.

In the case where the FBS unit 3 is used as a flat-bed scanner, the cover 7 is opened to place documents on the first platen glass 60. In the multi-function device 1 according to the present example, a size of the first platen glass 60 is configured to be slightly larger than a size of the document having A4-size. Rectangular documents are placed on the first platen glass 60, with the longitudinal direction thereof set to the width direction of the multi-function device 1. Then, the cover 7 is closed to fix the documents on the first platen glass 60, and the image scanning unit 64 scans along the first platen glass 60. Whereby, a scan using the FBS unit 3 as a flat-bed scanner is performed.

The scanning platform 5 is provided with a casing 65 having a thin-box shape. The image scanning unit 64 is arranged at an inner space of the casing 65 so as to move horizontally in a reciprocating manner. Openings for exposing the first platen glass 60 and the second platen glass 61 are formed on the upper face of the casing 65. This type of a casing can be made by, for example, molding a synthetic-resin material.

The casing 65 is provided with ribs for supporting the first platen glass 60 and the second platen glass 61, bosses for screwing various members and through holes for electric wiring, which are to be designed as appropriate depending on the design of the scanning platform 5. Therefore, a detailed description for those members will be omitted herein.

The image scanning unit 64 has a contact image sensor (hereinafter, referred to as CIS) 66 and a sensor carriage 67. The sensor carriage 67 is mounted with the CIS 66 in such a way as to carry and support the CIS 66 thereon. Thereby, the CIS 66 is opposed to the lower faces of the first platen glass 60 and the second platen glass 61. The CIS 66 is a so-called contact image sensor having a light source that emits light to irradiate documents, a lens that guides light reflected from the documents to a photoelectric conversion element, and the photoelectric conversion element that outputs electric signals in accordance with the intensity of the reflected light.

The CIS 66 is mounted on the sensor carriage 67 and is moved back and forth beneath the first platen glass 60. Although not shown in FIG. 5, a guide shaft is installed in the width direction of the casing 65 (the lateral direction in FIG. 5), and the sensor carriage 67 smoothly slides and moves along the guide shaft. A belt driving mechanism (not shown) is provided along the guide shaft. The belt driving mechanism has a timing belt that is held between pulleys in the same way as the belt driving mechanism 38. The sensor carriage 67 is fixed to the timing belt of the belt driving mechanism and moved in a reciprocating manner by a circumferential movement of the timing belt.

In the case where the FBS unit 3 is used as a flat-bed scanner, the sensor carriage 67 is moved beneath the first platen glass 60 along the first platen glass 60, and the CIS 66 that is mounted on the sensor carriage 67 scans images of documents placed on the first platen glass 60.

As shown in FIG. 1, the cover 7 is provided with the ADF 6 which continuously feeds documents from a document tray 70 via a document feeding path 71 (refer to FIG. 6) to an ejection tray 72. In the course of feeding by the ADF 6, the documents are fed onto the second platen glass 61, and images of the documents are scanned by the image scanning unit 64 positioned beneath the second platen glass 61.

As shown in FIG. 5, a stopper accommodating portion 68 is disposed at a position near to the ADF 6 in the casing 65 (the left side in FIG. 5), the position being outside a range of reciprocating movement of the image scanning unit 64. The position where the stopper accommodating portion 68 is disposed is also configured to be outside the areas where the first platen glass 60 and the second platen glass 61 are disposed. More specifically, the stopper accommodating portion 68 is disposed at the position outside the scanning areas of the first platen glass 60 and the second platen glass 61. The stopper accommodating portion 68 will be described regarding the configuration in detail later.

Figure 6:
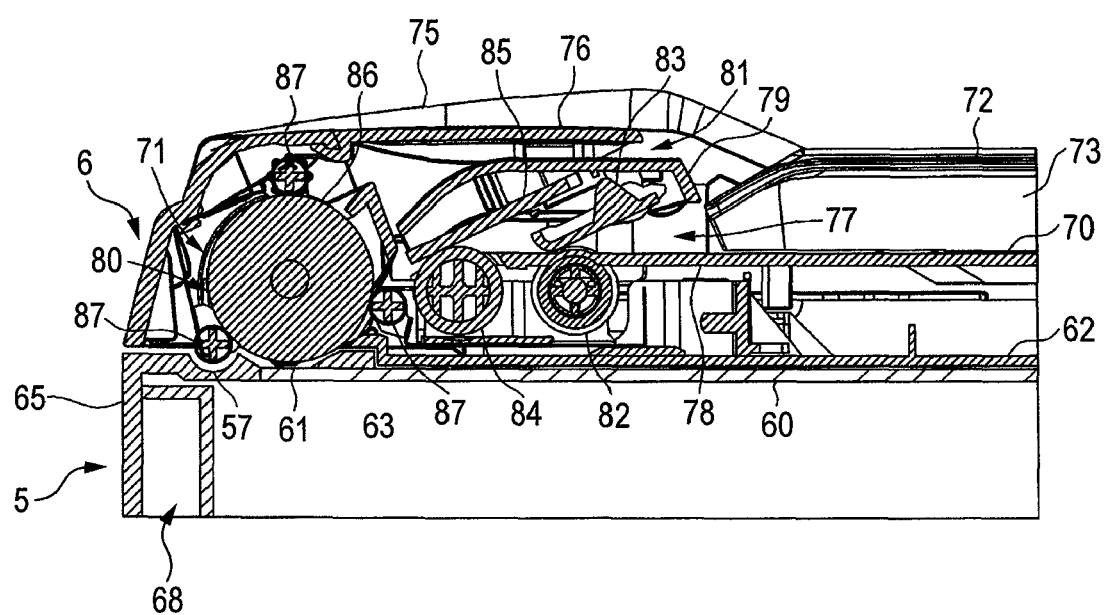
FIG. 6 is a sectional view showing an inner configuration of an ADF.

FIG. 6 is a sectional view showing an inner configuration of the ADF 6. As shown in FIG. 1 and FIG. 6, the document tray 70 and the ejection tray 72 are arranged on the cover 7 in a manner that the ejection tray 72 is stacked on the document tray 70. The document tray 70 is monolithically formed with the upper face of the cover 7. A document to be scanned for an image by the ADF 6 is placed on the document tray 70, with a plurality of the documents being layered, in such a way that the document is inserted from the leading end in the feeding direction into the ADF 6. The document tray 70 is provided with a pair of document guides 73 apart from the depth direction of the multi-function device 1 in such a way as to slide and move toward the depth direction. The document guide 73 rises from the document tray 70, and regulates the position of the width direction of the documents placed on the document tray 70.

When either one of the document guides 73 is slid and moved by a known interlocking mechanism, the other document guide 73 is also slid and moved to the opposite direction accordingly. Where the document width is narrow, either one of the document guides 73 on the front face of the multi-function device 1 is slid and moved, by which the other document guide 73 on the back face is slid and moved to the front face accordingly. Therefore, the document width regulated by a pair of the document guides 73 can be made narrow on the basis of a substantially center of the depth direction. On the other hand, where the document width is wide, either of the document guides 73 on the front face of the multi-function device 1 is slid and moved to the front face, by which the other document guide 73 on the back face is slid and moved to the back face accordingly. Therefore, the document width regulated by a pair of the document guides 73 can be made wide.

An ejection tray 72 is monolithically formed on a pair of the document guides 73 vertically apart from the document tray 70. A document discharged from the ADF 6 is held on both ends by the ejection tray 72 and retained separate from a document on the document tray 70. Since the ejection tray 72 is shorter in length of the sheet discharging direction than the document, the leading end portion of the document in the sheet discharging direction is retained on the document tray 70 so as to hang down from the ejection tray 72. Therefore, the leading end portion of the document on the ejection tray 72 in the sheet discharging direction is super imposed on the rear end portion of the document on the document tray 70 in the sheet feeding direction. However, since the leading end portion of the document on the document tray 70 in the sheet feeding direction and the rear end portion of the document on the ejection tray 72 in the sheet discharging direction are retained in two stages (upper and lower) by the ejection tray 72, there is no chance that these documents are erroneously mixed. Further, the ejection tray 72 is made short, by which a space necessary on the cover 7 can be made small and the multi-function device 1 can also be made thin and small.

As shown in FIG. 1, a document stopper 74 is provided on the document tray 70 at a position opposite to a side where the ADF 6 is disposed. The document stopper 74 changes in posture into an upraised posture which rises from the upper face of the document tray 70 and a down-laid posture which lays down to form substantially uniform surface with the upper face of the document tray 70. In FIG. 1, the document stopper 74 is in the down-laid posture. When changed into the upraised posture, the document stopper 74 rises above from the document tray 70. When the document stopper 74 is in the upraised posture and, for example, a document similar in size to the document tray 70 is thereby discharged from the ADF 6, the document is stopped by the document stopper 74 and prevented from slipping off from the document tray 70.

As described above, the discharged document is received by the document stopper 74, by which the document tray 70 can be made small in area and the cover 7 integrally formed with the document tray 70 can also be made small. Further, where the document stopper 74 is not needed, it can be changed into a down-laid posture and not projected from the cover 7, thereby the multi-function device 1 can be made compact on packaging or storage.

As shown in FIG. 6, the document feeding path 71 that connects the document tray 70 with the ejection tray 72 is formed inside the ADF 6 in a substantially laterally-facing U-lettered shape. The document feeding path 71 is configured by an ADF body 75 integrally formed with the cover 7 and an ADF cover 76 provided so as to open and close with respect to the ADF body 75. A suction chute portion 77 is formed so as to continue from the document tray 70 to the document feeding path 71.

The suction chute portion 77 of the ADF 6 is configured as a path having a predetermined vertical width so as to extend from the document tray 70, with a guide plate 78 integrally formed with the ADF body 75 and a partition plate 79 placed inside the ADF cover 76 used as a guide face.

The document feeding path 71 is formed in a substantially laterally-facing U-lettered shape from the suction chute portion 77 via a bent portion 80 to a document discharge chute portion 81. The bent portion 80 and the sheet discharge chute portion 81 are continuously formed as a predetermined-wide path by the ADF body 75, the ADF cover 76, the partition plate 79, etc. A document set on the document tray 70 is guided into the suction chute portion 77, fed to the bent portion 80 and discharged from the sheet discharge chute portion 81 to the ejection tray 72.

Feeding mechanism for feeding documents is provided on the document feeding path 71. The feeding mechanism is provided with a suction roller 82, a suction nip piece 83 that pressure contacts with the suction roller 82, a separation roller 84, a separation nip piece 85 that pressure contacts with the separation roller 84, a feeding roller 86, and a pinch roller 87 that pressure contacts with the feeding roller 86.

The suction roller 82 is provided so as to rotate at a substantially center of the suction chute portion 77, with a part of the roller face thereof being exposed from the upper face of the guide plate 78. The separation roller 84 is provided so as to rotate at a position apart from the suction roller 82 to the feeding direction, with a part of the roller face thereof being exposed from the upper face of the guide plate 78. A driving force is transmitted to the suction roller 82 and the separation roller 84 from a motor to be rotation driven.

The suction nip piece 83 is provided at an opposing position of the suction roller 82 of the partition plate 79 so as to vertically move in a direction touching on or off the suction roller 82. The suction nip piece 83 is a pad-like substance slightly narrower than the roller width in an axial direction of the suction roller 82, and touches on or off the roller face of the suction roller 82. The suction nip piece 83 is elastically urged downward by a spring member (not shown) and steadily in contact with the suction roller 82 in a state that documents are not nipped.

The separation nip piece 85 is provided at an opposing position of the separation roller 84 of the partition plate 79 so as to vertically move in a direction touching on or off the separation roller 84. The separation nip piece 85 is a pad-like substance slightly narrower than the roller width in an axial direction of the separation roller 84, and touches on or off the roller face of the separation roller 84. The separation nip piece 85 is elastically urged downward by a spring member (not shown) and allowed to be steadily in a pressure contact with the roller face of the separation roller 84 in a state that documents are not nipped.

The feeding roller 86 is disposed on the bent portion 80 of the document feeding path 71 which is in a substantially laterally-facing U-lettered shape. The feeding roller 86 is of an outer diameter to an extent that the roller face thereof constitutes a part of the bent portion 80. As with the suction roller 82 and the separation roller 84, a driving force is transmitted to the feeding roller 86 by a motor to be rotation driven.

Pinch rollers 87 are provided at three positions around the feeding roller 86. Each of the pinch rollers 87 is elastically urged at the axis by a spring piece and supported to the ADF body 75 or the ADF cover 76 so as to rotate freely. Thereby, each of the pinch rollers 87 is allowed to make a pressure contact with the roller face of the feeding roller 86. When the feeding roller 86 is rotated, the pinch roller 87 is also rotated accordingly. A document is allowed to make a pressure contact with the feeding roller 86 by the pinch roller 87, by which the rotating force of the feeding roller 86 is moved to the document.

A document discharge chute portion 81 is formed down stream in the sheet feeding direction of the feeding roller 86. The sheet discharge chute portion 81 is formed between the ADF cover 76 and the partition plate 79 so as to continue to the bent portion 80 of the document feeding path 71. Documents fed from the document tray 70 to the document feeding path 71 are sequentially passed through the suction chute portion 77, the bent portion 80, and the sheet discharge chute portion 81 and are discharged to the ejection tray 72. In the course of such movement, documents pass on the second platen glass 61 and images of the documents are read by the image scanning unit 64 standing by below the second platen glass 61.

As shown in FIG. 1, an operation panel 8 is provided on the front face of a multi-function device 1. The operation panel 8 is provided with various types of operation buttons and a liquid crystal display portion. The multi-function device 1 is operated on the basis of the instructions given from the operation panel 8. The multi-function device 1 is connected to a computer and operated also on the basis of the instructions given via driver software such as a printer driver and a scanner driver from the computer, in addition to the instructions given from the operation panel 8.

A slot portion 9 capable of loading various types of small-sized memory cards (a recording medium) is provided at the left upper part on the front face of the multi-function device 1. Image data stored in the small-sized memory card loaded into the slot portion 9 is read out to display information about the image data on the liquid crystal display portion, and any given images are recorded on sheet by the printer portion 3. The input for this purpose is carried out from a computer connected to the operation panel 8 or the multi-function device 1.

Figure 7:
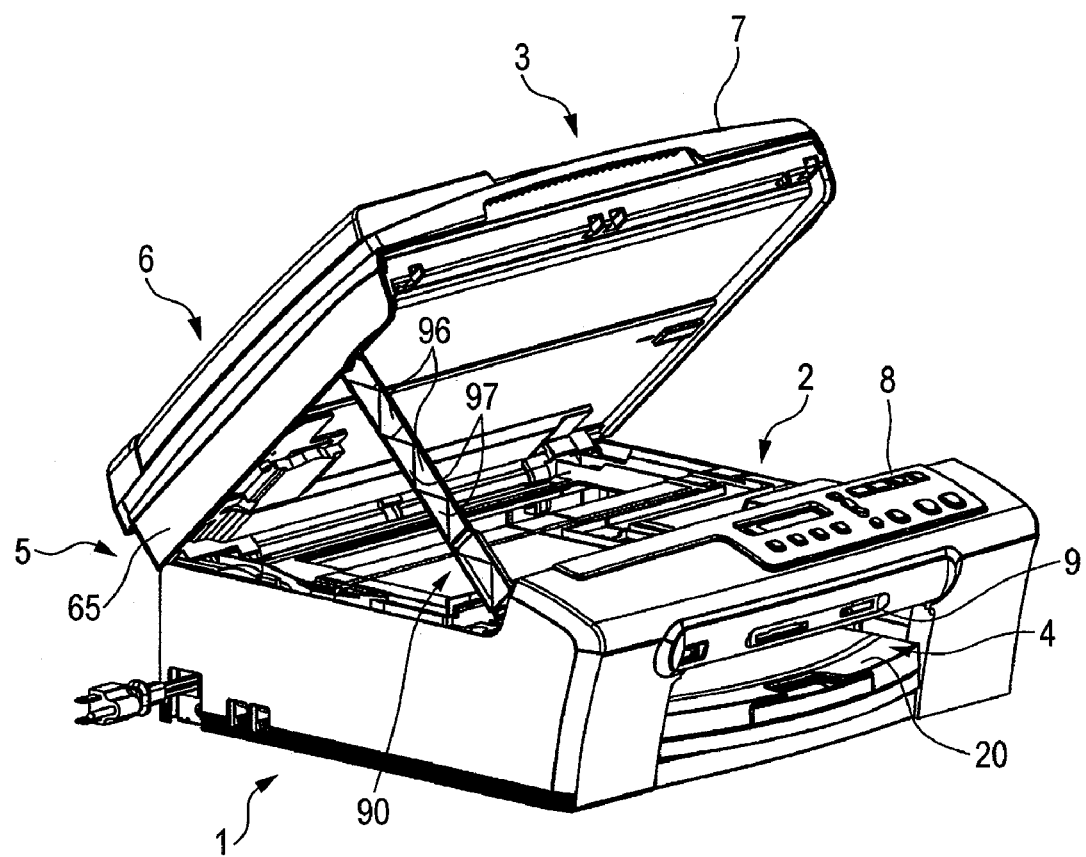
FIG. 7 is a perspective view showing an appearance of the multi-function device in a state where an FBS unit is opened.

Hereinafter, a detailed description will be made for a structure where the FBS unit 3 is opened or closed with respect to the printer unit 2. FIG. 7 is an appearance perspective view showing a state that the FBS unit 3 is opened with respect to the printer unit 2. As shown in FIG. 7, a casing 65 of a scanning platform 5 is supported to the printer unit 2 so as to rotate, with the back face of the multi-function device 1 used as an axis. Thereby, the scanning platform 5 is opened upward with respect to the printer unit 2, with the front face of the multi-function device 1 used as a free end. The operation panel 8 is fixed to the printer unit 2 and not opened or closed in association with the scanning platform 5. As described above, the FBS unit 3 is opened to expose the interior of the printer unit 2, by which an operational maintenance such as paper jam treatment is conducted.

A stopper 90 is provided between the printer unit 2 and the FBS unit 3. The stopper 90 is a flat plate, the length of which is slightly shorter than the depth of the multi-function device 1. The base end of the stopper 90 is connected to the upper part of the printer unit 2 near the front face of the multi-function device 1, so as to freely rotate, The stopper 90 is extended to the depth direction of the multi-function device 1. The back face of the multi-function device 1 on the stopper 90 is a rotationally moving leading end and connected to the casing 65 so as to slide freely. As shown in FIG. 7, the stopper 90 supports the FBS unit 3 as a brace in a state that the FBS unit 3 is opened with respect to the printer unit 2.

Figure 8:
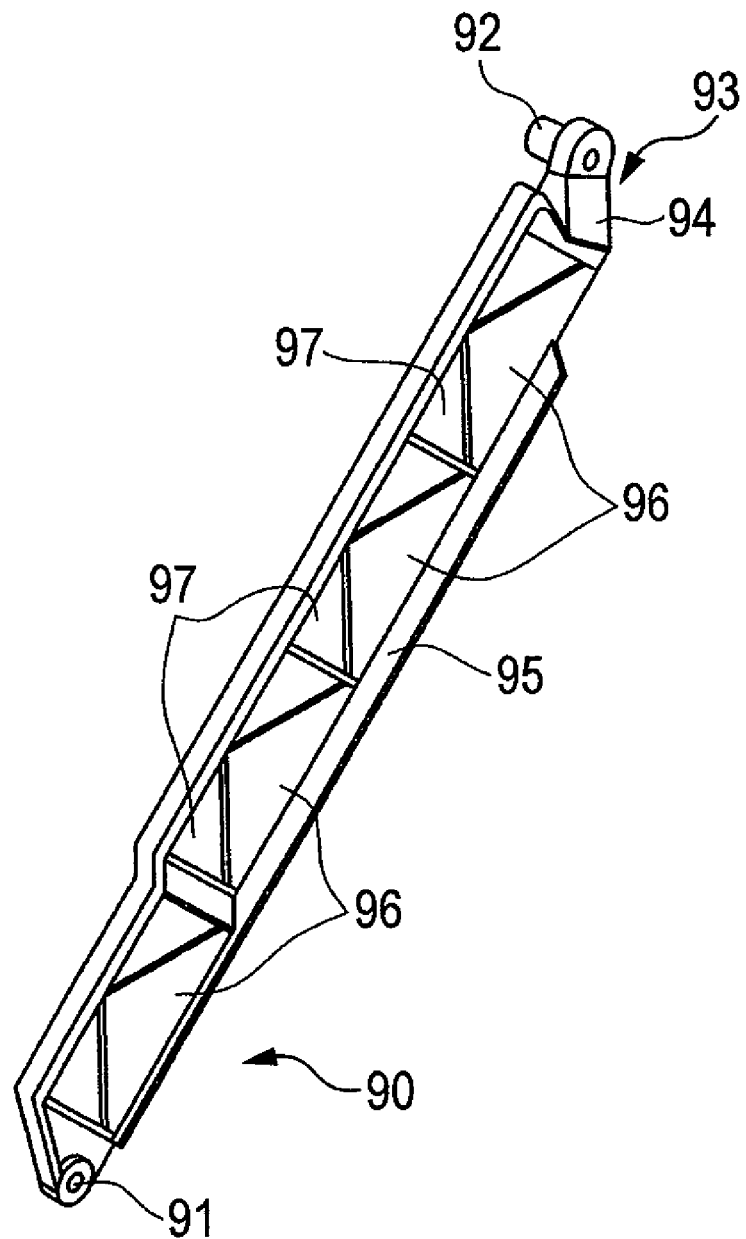
FIG. 8 is a perspective view showing a configuration of a stopper.

FIG. 8 is a perspective view showing a configuration of the stopper 90. The stopper 90 is a flat shaped member broad in the height direction of the multi-function device 1, and can be made by, for example, molding a synthetic-resin material.

A pin hole 91 is formed at the base end of the stopper 90 in the thickness direction. A pin of the printer unit 2 (not shown) is inserted into the pin hole 91, by which the base end of the stopper 90 is connected to the printer unit 2 so as to freely rotate.

An engaging pin 92 projecting to the thickness direction of the stopper 90 is formed at the rotationally moving leading end of the stopper 90. The engaging pin 92 is engaged with a guide groove 103 of a friction adjusting member 100 to be described later. A friction portion 93 (friction member) is formed in the vicinity of the engaging pin 92. The friction portion 93 is in a wedge shape which is made wider toward the base end. The surface of the friction portion 93 is covered with a friction rubber 94. The friction rubber 94 is an elastic member made with rubber and provided for causing a desirable sliding friction. The friction rubber 94 is fixed to the friction portion 93 by being adhered thereto.

A rib 95 is provided on the bottom face of the stopper 90. The rib 95 is projected substantially all over the length direction of the stopper 90 from the bottom face thereof to the thickness direction, thereby the bottom face of the stopper 90 is expanded. Thus, the stopper 90 is increased in rigidity.

A reinforcing portion 96 projecting to the thickness direction is formed on the front and back faces of the stopper 90. Each of the reinforcing portions 96 on the side shown in FIG. 8 are formed in a triangular shape in which the bottom face of the stopper 90 is given as the base and the upper face is given as the apex. Each of the reinforcing portions 96 in the triangle is connected on the base and arrayed in the length direction of the stopper 90. Although not shown in FIG. 8, the reinforcing portions 96 are also formed on a face (front face) opposite to the face (back face) shown in FIG. 8 (refer to FIG. 7).

The reinforcing portions 96 respectively formed on the front and back faces of the stopper 90 project alternately from the front and back faces in the thickness direction of the stopper 90. In other words, as shown in FIG. 8, the reinforcing portions 96 projecting from the back face to the thickness direction are formed on the back face of the stopper 90 given in FIG. 8 corresponding to a recessed portion 97 at which no reinforcing portion 96 is formed. Therefore, as shown in FIG. 7, the reinforcing portions 96 on the back face are formed in a triangular shape in which the upper face of the stopper 90 is given as the base and the bottom face is given as the apex. Then, the recessed portion 97 where no reinforcing portion 96 is formed on the back face corresponds to the reinforcing portions 96 on the front face of the stopper 90 given in FIG. 8. As described above, the reinforcing portions 96 are formed on the front and back faces of the stopper 90 at constant intervals, thereby an appearance of the stopper 90 is improved.

Further, these reinforcing portions 96 formed on the front and back faces of the stopper 90 are overlapped on the front and back faces on a boundary area with the recessed portion 97. More specifically, the reinforcing portions 96 exist both on the front and back faces of the stopper 90 on the boundary area. Thereby, an overlapped portion of the reinforcing portions 96 is formed like a brace which connects the upper face of the stopper 90 with the bottom face. Thus, the stopper 90 is increased in rigidity.

The engaging pin 92 of the stopper 90 is engaged with a friction adjusting member 100 provided at a stopper accommodating portion 68 of the casing 65 and able to slide along the stopper accommodating portion 68. A description will be made later for engagement of the engaging pin 92 with the friction adjusting member 100.

Figure 9:
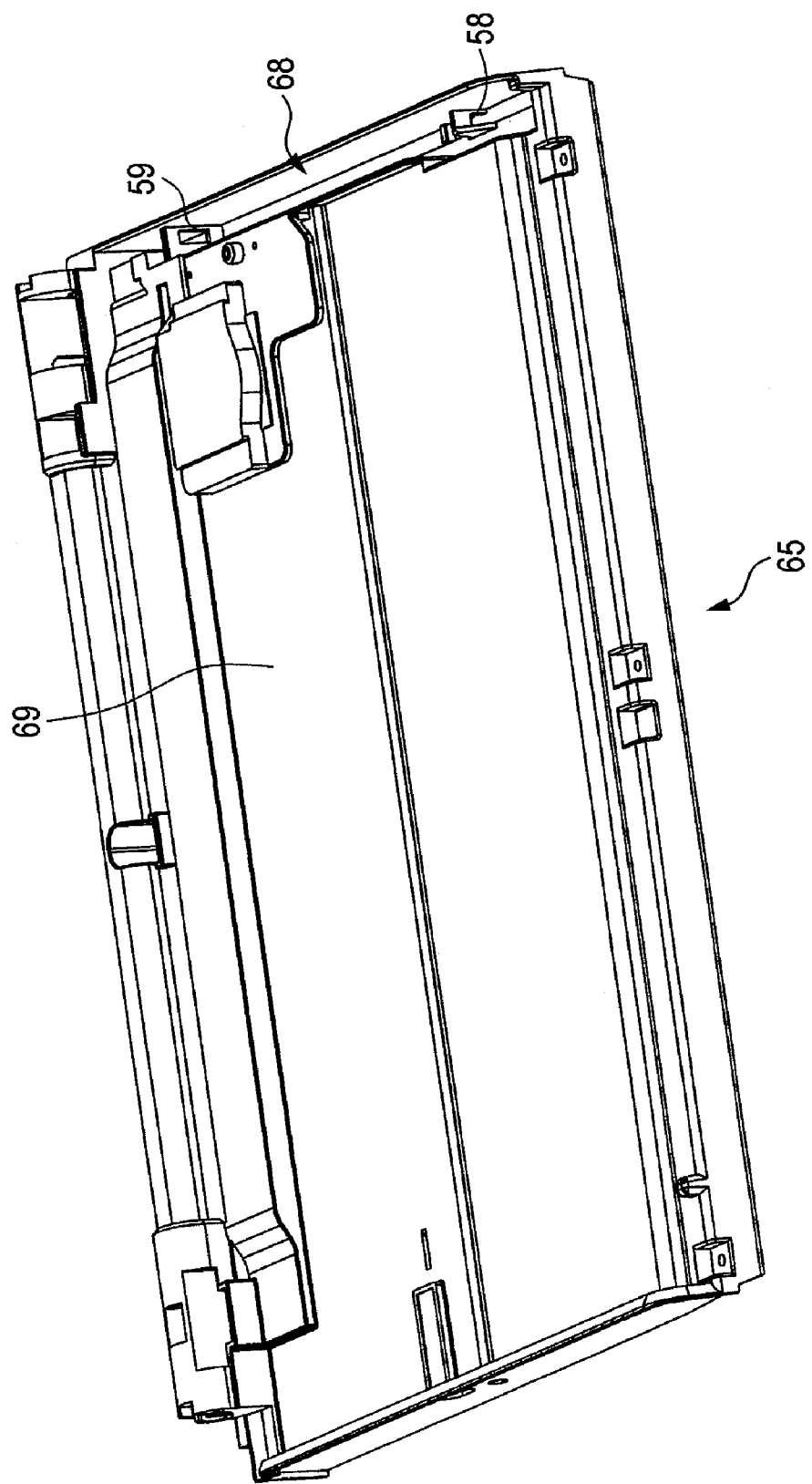
FIG. 9 is a perspective view showing a bottom plate of a casing.

FIG. 9 is a perspective view showing the bottom face of the casing 65. In FIG. 9, the upper side is the back face of the multi-function device 1, and the lower side is the front face of the multi-function device 1. Further, the right side in FIG. 9 is the side on which the stopper 90 is arranged. As shown in FIG. 9, the stopper accommodating portion 68 is formed in the vicinity of the side line on the bottom face of the casing 65. A part of the bottom plate 69 of the casing 65 is recessed into the casing 65 to form a stopper accommodating portion 68.

The stopper accommodating portion 68 is formed in such a way that the depth direction of the multi-function device 1 is made longer to correspond to the stopper 90. The stopper accommodating portion 68 is sufficiently large to accommodate the stopper 90 and the friction adjusting member 100 arranged in the thickness direction.

Accordingly, as shown in FIG. 1, when the FBS unit 3 is closed with respect to the printer unit 2, the stopper 90 is moved rotationally so as to fall down to the printer unit 2 and accommodated into the stopper accommodating portion 68. Thus, the accommodated stopper 90 is, as shown in FIG. 5, positioned substantially parallel to the bottom face of the casing 65 and at a height approximately equal to the image scanning unit 64. Such a necessity of providing on the casing 65 a height area for accommodating the stopper 90 below the image scanning unit 64 is eliminated, thereby the FBS unit 3 can be made thin.

Figure 10:
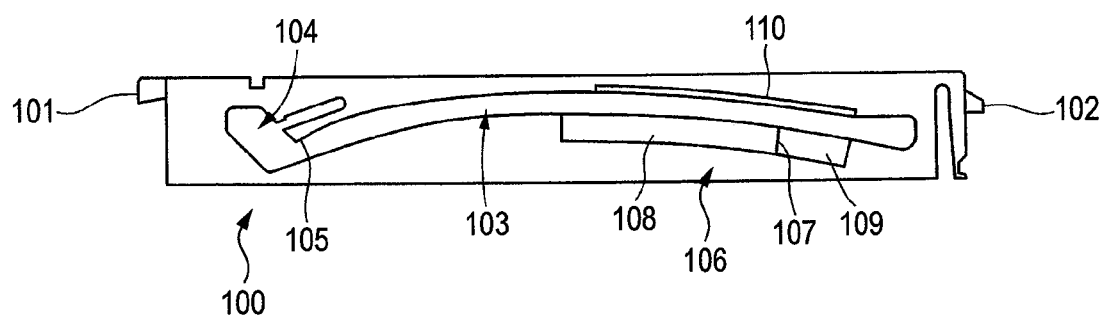
FIG. 10 is a perspective view showing a configuration of a friction adjusting member.

FIG. 10 is a front view showing a configuration of the friction adjusting member 100 which is accommodated into the stopper accommodating portion 68 to guide the rotationally moving leading end of the stopper 90. In FIG. 10, the left side 25 is the front face of the multi-function device 1 and the right side is the back face of the multi-function device 1. The friction adjusting member 100 is a flat-shaped member broad in the height direction of the multi-function device 1 and can be made by molding a synthetic-resin material. A first engaging projection 101 is formed on one end of the friction adjusting member 100, and a second engaging projection 102 is formed on the other end. The friction adjusting member 100 is attached inside the stopper accommodating portion 68 by the first engaging projection 101 and the second engaging projection 102.

As shown in FIG. 9, the stopper accommodating portion 68 is provided with a first engaging hole 58 and a second engaging hole 59 apart in the depth direction of the multi-function device 1. The first engaging hole 58 is apart from the second engaging hole 59 in a distance corresponding to the length of the friction adjusting member 100. The first engaging projection 101 is inserted into the first engaging hole 58. The first engaging projection 101 is fixed by the first engaging hole 58 at a position substantially constant to the height direction of the multi-function device 1. The second engaging projection 102 is inserted into the second engaging hole 59. The second engaging hole 59 is a hole longer in the height direction of the multi-function device 1.

Due to the configuration, the second engaging projection 102 is vertically moved within a range of the second engaging hole 59. As described above, the friction adjusting member 100 is attached to the stopper accommodating portion 68. The friction adjusting member 100 is vertically moved on the second engaging projection 102 within a range of the second engaging hole 59, with the first engaging projection 101 used as an axis. This vertical movement allows the friction adjusting member 100 to change in posture into a pressure contact posture (first posture) and a non-pressure contact posture (second posture).

As shown in FIG. 10, the friction adjusting member 100 is provided with a guide groove 103 in the longitudinal direction. An engaging pin 92 of the stopper 90 is inserted into a guide groove 103. The engaging pin 92 is able to slide and move freely along the guide groove 103. Thereby, the rotationally moving leading end of the stopper 90 is moved in a sliding manner toward the depth direction of the multi-function device 1 in association with the opening and closing of the scanning platform 5. A locking groove 104 continues from the guide groove 103 and also extends upward from the guide groove 103 at one end of the guide groove 103, which is the front face of the multi-function device 1. The engaging pin 92 advances from the guide groove 103 into the locking groove 104, by which, as shown in FIG. 7, the stopper 90 is retained in a posture for supporting the FBS unit 3.

An elastically deformable projection 105 is formed at a boundary between the guide groove 103 and the locking groove 104 in a direction of expanding the groove width of the guide groove 103. In order for the engaging pin 92 once advanced into the locking groove 103 to return to the guide groove 103, the projection 105 needs to undergo an elastic deformation. Thereby, when the FBS unit 3 is closed with respect to the printer unit 2, the engaging pin 92 advancing from the locking groove 104 into the guide groove 103 allows the projection 105 to undergo an elastic deformation, a clicking sense is applied to the operation.

A pressure contact portion 106 is formed at one side of the front and back faces on the friction adjusting member 100, in other words, at a side on which the stopper 90 is arranged (the front side in FIG. 10). The pressure contact portion 106 is formed along the lower edge of the guide groove 103 from the center of the friction adjusting member 100 toward the back face of the multi-function device 1. The pressure contact portion 106 projects to the thickness direction of the friction adjusting member 100 from the center to the back face of the multi-function device 1, and the projection disappears. More specifically, the pressure contact portion 106 is in a ridge shape, with slopes formed on both ends of a top 107. A gentle slope 108 is formed from the top 107 to the center, while a steep slope 108 is formed from the top 107 to the end. When the engaging pin 92 of the stopper 90 is slid along the guide groove 103, the friction portion 93 is allowed to make a pressure contact with the pressure contact portion 106.

In response to the pressure contact portion 106, a collar 110 projected toward the same direction as the pressure contact portion 106 is formed along the upper edge of the guide groove 103. The collar 110 uses the pressure contact portion 106, thereby the engaging pin 92 of the stopper 90 which is moved toward the direction removing from guide groove 103 is prevented from removing from the guide groove 103.

Figure 11:
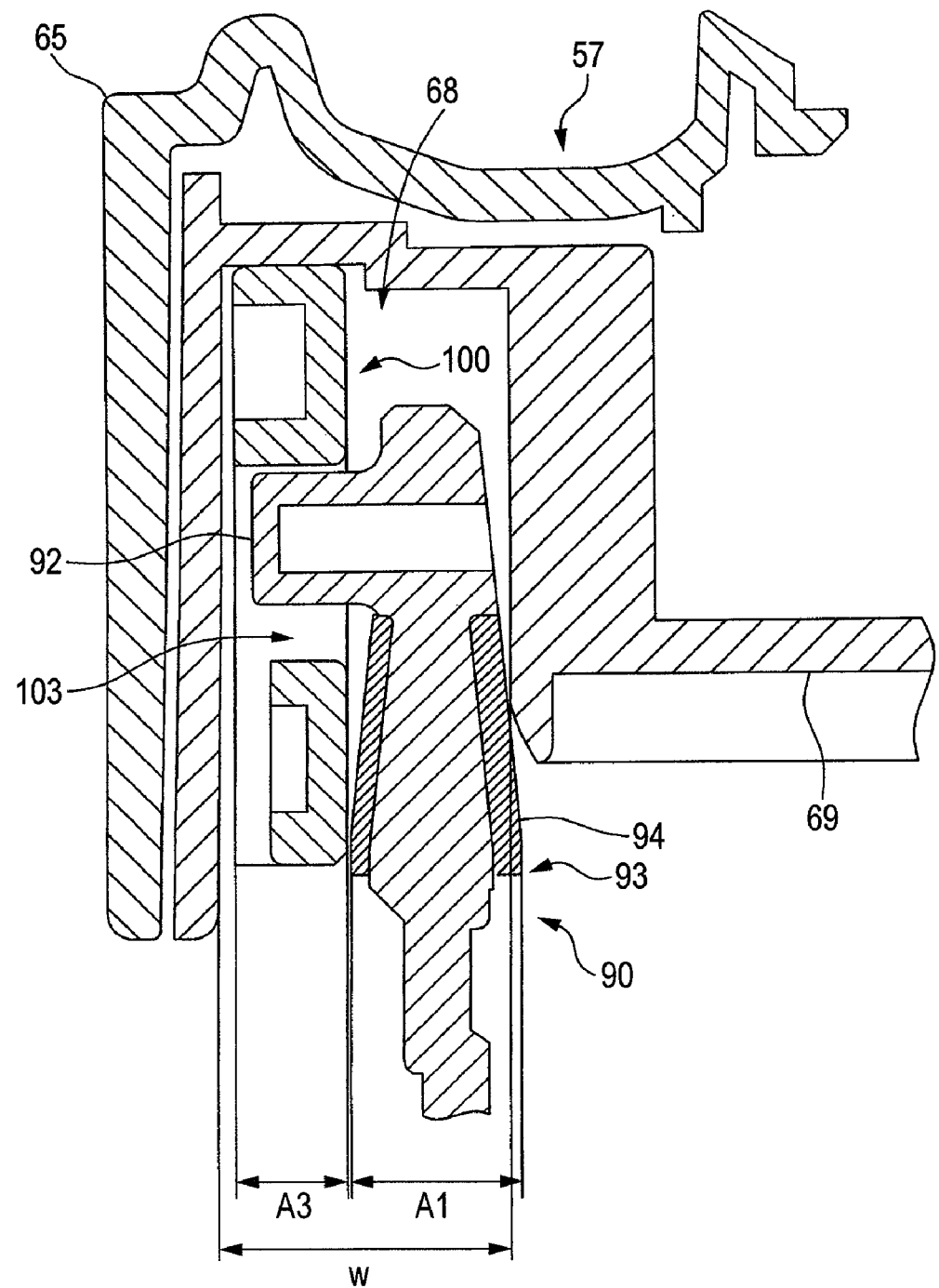
FIG. 11 is a sectional view showing an inner configuration of a stopper accommodating portion.
Figure 12:
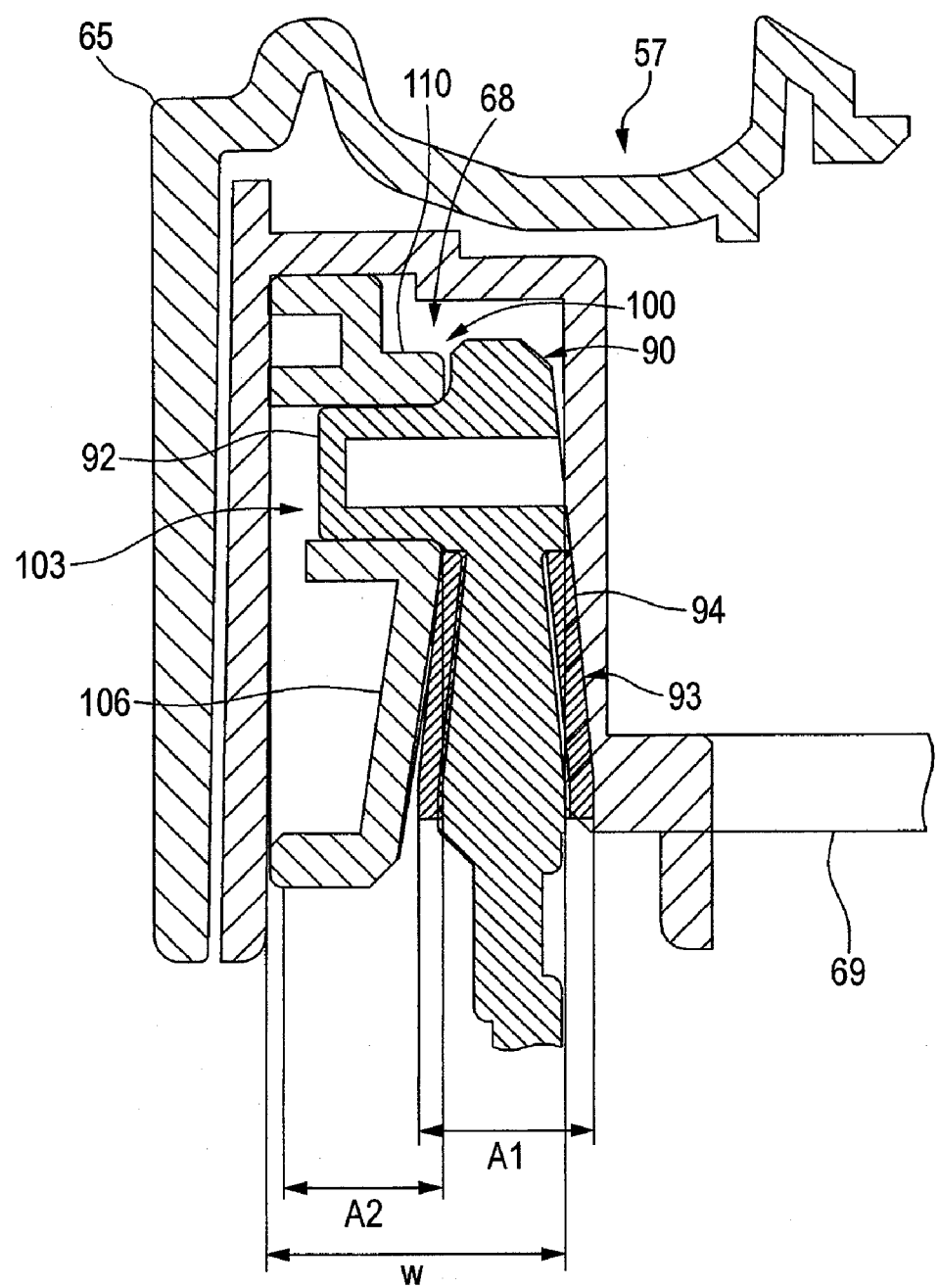
FIG. 12 is a sectional view showing an inner configuration of the stopper accommodating portion.

Hereinafter, a description will be made for the relationship between width W of the stopper accommodating portion 68, maximum thickness A1 of the friction portion 93, thickness A2 of the pressure contact portion 106, and thickness A3 of the friction adjusting member 100 other than the pressure contact portion 106. FIG. 11 and FIG. 12 are sectional views showing an interior configuration of the stopper accommodating portion 68. It is noted that FIG. 11 and FIG. 12 illustrate the cross section of the stopper accommodating portion 68 in the width direction of the multi-function device 1.

As shown in FIG. 11, the thickness A3 of the friction adjusting member 100 other than the pressure contact portion 106 is thinner than a length obtained by subtracting the maximum thickness A1 of the friction portion 93 from the width W of the stopper accommodating portion 68. In other words, the relationship of A3<W−A1 is obtained.

Therefore, in a pressure contact posture where the friction adjusting member 100 is embedded into the stopper accommodating portion 68, the friction portion 93 which is slid and moved along the guide groove 103 is not allowed to make a pressure contact with the inner wall of the friction adjusting member 100 or that of the stopper accommodating portion 68, by which it can be smoothly slid and moved without receiving an excessive sliding resistance.

As shown in FIG. 12, the thickness A2 of the friction adjusting member 100 including the pressure contact portion 106 is thicker than a length obtained by subtracting the maximum thickness A1 of the friction portion 93 from the width W of the stopper accommodating portion 68. In other words, the relationship of A2>W−A1 is obtained.

Therefore, in the friction adjusting member 100 of a pressure contact posture, the friction portion 93 which is slid and moved along the guide groove 103 is allowed to make a pressure contact with the inner wall of the friction adjusting member 100 and that of the stopper accommodating portion 68. Thereby, when the friction portion 93 passes through an area of the pressure contact portion 106, the friction portion 93 is held inside between the pressure contact portion 106 and the stopper accommodating portion 68 and moved in a sliding manner between them, thus a sliding resistance can be generated.

Figure 13:
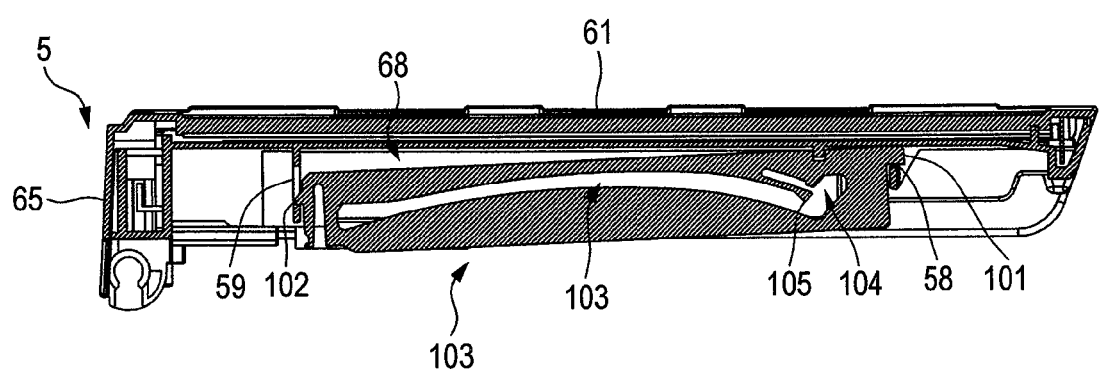
FIG. 13 is a sectional view showing an inner configuration of the stopper accommodating portion.
Figure 14:
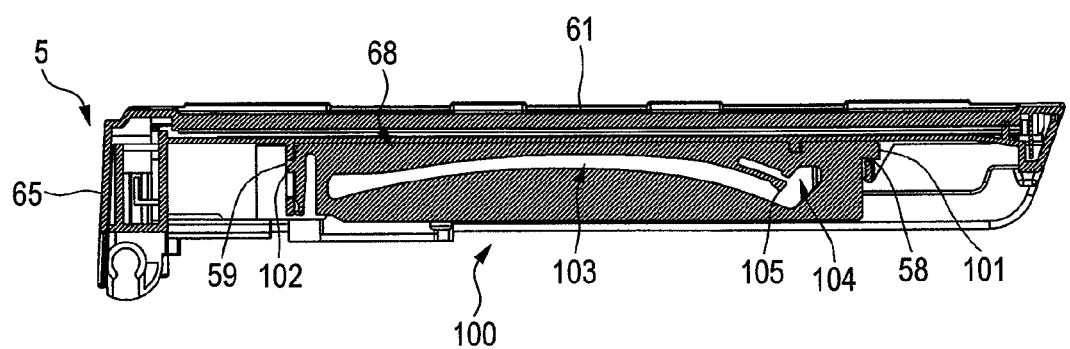
FIG. 14 is a sectional view showing an inner configuration of the stopper accommodating portion.
Figure 15:
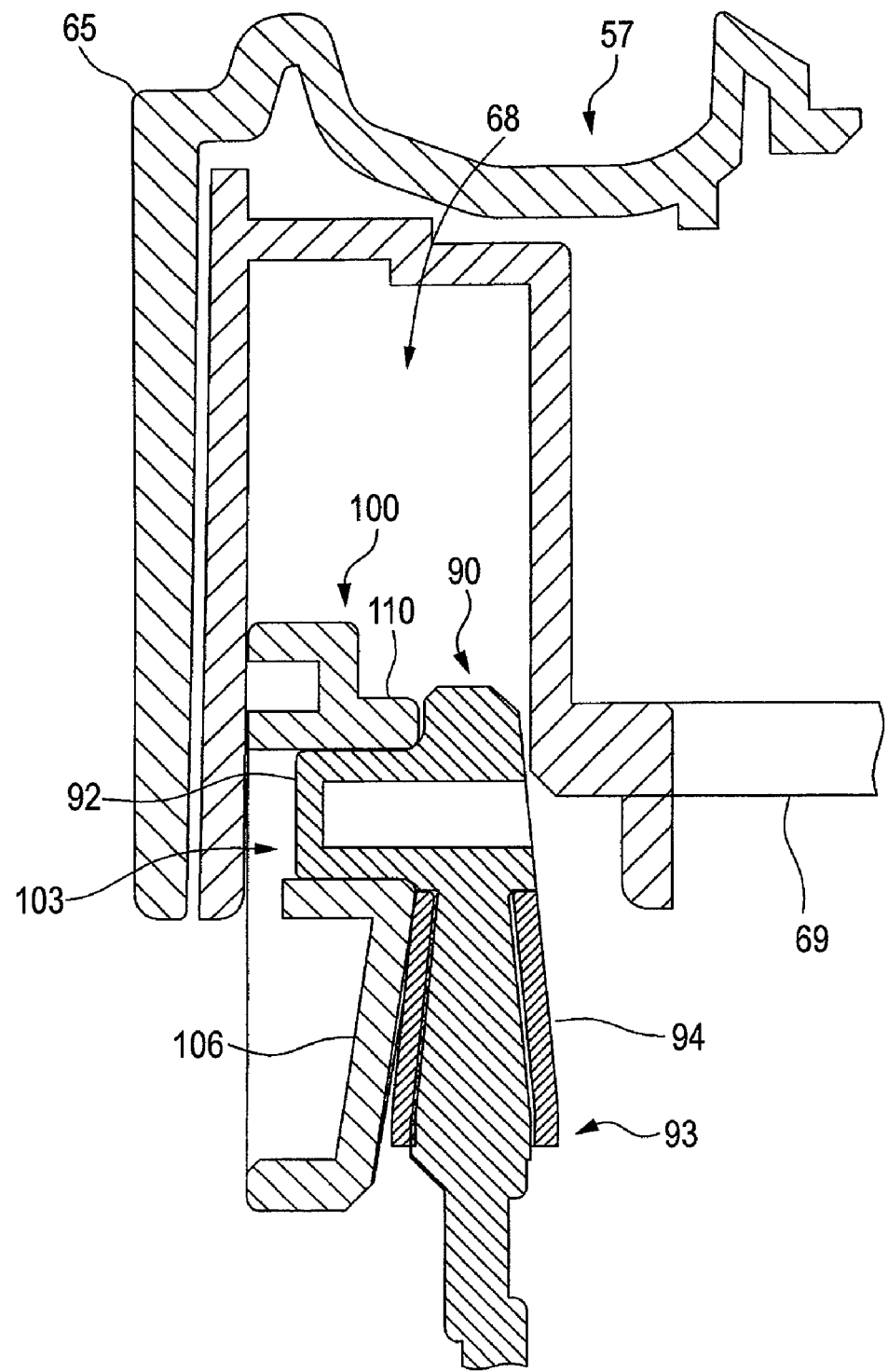
FIG. 15 is a sectional view showing an inner configuration of the stopper accommodating portion.

Hereinafter, a description will be made for movements of the stopper 90 and the friction adjusting member 100 in association with opening and closing of the FBS unit 3. FIG. 13 is a sectional view showing an inner configuration of the stopper accommodating portion 68 where the friction adjusting member 100 is in a non-pressure contact posture. FIG. 14 is a sectional view showing an inner configuration of the stopper accommodating portion 68 where the friction adjust-ing member 100 is in a pressure contact posture. FIGS. 13 and 14 illustrate the cross section of the stopper accommodating portion 68 in the depth direction of the multi-function device 1. FIG. 15 is a sectional view showing the relationship between the friction portion 93 and the pressure contact portion 106 in a non-pressure contact posture. FIG. 15 illustrates a cross section of the stopper accommodating portion 68 in the width direction of the multi-function device 1.

In association with opening and closing of the FBS unit 3 with respect to the printer unit 2, the stopper 90 is moved rotationally, with the pin hole 91 on the base end used as a rotationally moving axis. The engaging pin 92 on a rotationally moving leading end of the stopper 90 is slid and moved along the guide groove 103 of the friction adjusting member 100. The friction adjusting member 100 is accommodated into the stopper accommodating portion 68 of the casing 65 in the FBS unit 3 and moved rotationally together with the FBS unit 3, with the back face of the multi-function device 1 used as a rotationally moving axis.

As described above, the friction adjusting member 100 is vertically moved on the second engaging projection 102 within a range of the second engaging hole 59, with the first engaging projection 101 used as an axis, and the friction adjusting member 100 undergoes a change in posture into a pressure contact posture and a non-pressure contact posture. As shown in FIG. 13, if no external force is applied to the friction adjusting member 100, the friction adjusting member 100 is lowered at the second engaging projection 102 (the back face of the device) by gravitational force. Thereby, a part of the friction adjusting member 100 is projected from the stopper accommodating portion 68. The part projected from the stopper accommodating portion 68 includes a pressure contact portion 106.

On the other hand, as shown in FIG. 14, if an upward external force is applied to the friction adjusting member 100, the friction adjusting member 100 is embedded into the stopper accommodating portion 68 against gravitational force. Therefore, the pressure contact portion 106 is also allowed to position inside the stopper accommodating portion 68.

When a state that the FBS unit 3 is closed with respect to the printer unit 2 as shown in FIG. 1 is changed into a state that the FBS unit 3 is opened with respect to the printer unit 2, as shown in FIG. 7, the friction adjusting member 100 attached to the stopper accommodating portion 68 of the casing 65 is rotationally moved upward, together with the FBS unit 3.

Since the engaging pin 92 of the stopper 90 is engaged with the guide groove 103 of the friction adjusting member 100, the engaging pin 92 is brought upward by the friction adjusting member 100 when the FBS unit 3 is opened. Thereby, the stopper 90 is rotationally moved so as to rise, and the engaging pin 92 allows the guide groove 103 to slide and move from the back face of the device to the front face of the device.

A downward load is applied to the friction adjusting member 100 as a reaction force by which the friction adjusting member 100 elevates the engaging pin 92 engaged with the guide groove 103. Thereby, the friction adjusting member 100 is, as shown in FIG. 13, lowered on the second engaging projection 102 below the second engaging hole 59, and a part thereof, that is, the pressure contact portion 106 is projected from the stopper accommodating portion 68. More specifically, the friction adjusting member 100 is changed into a non-pressure contact posture.

As shown in FIG. 15, the friction adjusting member 100 is changed into a non-pressure contact posture, by which the friction portion 93 can be moved toward a direction moving away from the friction adjusting member 100 (to the thickness direction) when the friction portion 93 passes through an area of the pressure contact portion 106. Therefore, the friction portion 93 moves away from the friction adjusting member 100 along the configuration of the pressure contact portion 106 and moves in a sliding manner along the guide groove 103. Since no excessive sliding friction is applied to the friction portion 93, the FBS unit 3 is opened smoothly.

The engaging pin 92 of the stopper 90 advances into the locking groove 104 from the guide groove 103 of the friction adjusting member 100, when the FBS unit 3 is completely opened. Thereby, the locking pin 92 is restricted for the sliding movement to a direction extending from the friction adjusting member 100 (the direction of the guide groove 103), and the stopper 90 is kept to rise as shown in FIG. 7. The stopper 90 supports, serving as a brace, the FBS unit 3 opened with respect to the printer unit 2.

When a state that the FBS unit 3 is opened with respect to the printer unit 2 as shown in FIG. 7 is changed into a state that the FBS unit 3 is closed with respect to the printer unit 2 as shown in FIG. 1, the FBS unit 3 is once brought upward so as to return the engaging pin 92 which has advanced into the locking groove 104 to the guide groove 103. Thereafter, the FBS unit 3 is brought downward, by which the locking pin 92 allows the projection 105 to undergo an elastic deformation and advances into the guide groove 103.

Since the engaging pin 92 of the stopper 90 is engaged with the guide groove 103 of the friction adjusting member 100, the engaging pin 92 is brought downward by the friction adjusting member 100 when the FBS unit 3 is closed. Thereby, the stopper 90 is rotationally moved so as to fall down, and the engaging pin 92 allows the guide groove 103 to slide and move from the front face of the device to the back face of the device.

An upward load is applied to the friction adjusting member 100 as a reaction force by which the friction adjusting member 100 brings downward the engaging pin 92 engaged with the guide groove 103. Thereby, the friction adjusting member 100 is, as shown in FIG. 14, elevated on the second engaging projection 102 above the second engaging hole, and an entire part of the friction adjusting member 100 including the pressure contact portion 106 is embedded into the stopper accommodating portion 68. More specifically, it is changed into a pressure contact posture.

As shown in FIG. 11, even if the friction adjusting member 100 is in a pressure contact posture, the inner wall of the friction adjusting member 100 or that of the stopper accommodating portion 68 is not allowed to make a pressure contact on passage of the friction portion 93 through an area other than the pressure contact portion 106, thereby no excessive sliding resistance is generated. When a state given in FIG. 7 is changed into a state that FBS unit 3 commences to close, the FBS unit 3 can be smoothly closed.

As shown in FIG. 12, the friction portion 93 slid and moved along the guide groove 103 is allowed to make a pressure contact with the inner wall of the friction adjusting member 100 and that of the stopper accommodating portion 68 on passage of the friction portion 93 through an area of the pressure contact portion 106, thereby a sliding resistance to the friction portion 93 is applied. Since the pressure contact portion 106 is provided with a gentle slope 108 at a portion toward a top 107, the sliding resistance is gradually increased. An abrupt rotational movement is thereby prevented in a state that the FBS unit 3 is half closed and thereafter. Then, at the time when the friction portion 93 passes through the top 107 of the pressure contact portion 106 and enters on a steep slope 109, the sliding resistance on the friction member 93 disappears. Thereby, the FBS unit 3 is completely closed with respect to the printer unit 2.

As shown in FIG. 1, when the FBS unit 3 is completely closed with respect to the printer unit 2, the stopper 90 completely lays down to the upper part of the printer unit 2 and extends in a horizontal direction. The thus laid stopper 90 is accommodated into a stopper accommodating portion 8 formed on the casing 65 of the FBS unit 3. As shown in FIG. 5, in this state, the stopper 90 is positioned above the bottom face of the casing 65. Thus, no clearance corresponding to the thickness of the stopper 90 is generated between the printer unit 2 and the FBS unit 3, by which the device can be made thinner.

The stopper accommodating portion 68 is a bottom face of the casing 65 and formed at the end of the device apart from the second platen glass 61. More specifically, it is formed outside a document scanning area of the FBS unit 3. As shown in FIG. 4, when the cover 7 is opened, the interior of the casing 65 is exposed through the platen glasses 60 and 61. The stopper accommodating portion 68 is projected into the casing 65 in order to form a space for accommodating the stopper 90 and the friction adjusting member 100, and the projected stopper accommodating portion 68 is not exposed to the scanning area. Thereby, the appearance is improved when the FBS unit 3 is used.

Further, the stopper 90 is arranged so as to extend in the depth direction of the device, with a pin hole 91 to be a base end being given as the front face of the device and an engaging pin 92 to be a rotationally moving leading end being given as the back face of the device. In the FBS unit 3, the image scanning unit 64 is moved in a reciprocating manner in the width direction of the device. As shown in FIG. 5, an area 57 corresponding to a pinch roller 87 of the ADF 6 is provided outside a range of the reciprocating movement. The image scanning unit 64 will be sufficient if it is moved below the second platen glass 61 and not required to be moved up to the above area 57. Therefore, the area 57 is allocated to the stopper accommodating portion 68, by which a stopper accommodating portion 68 can be formed on the casing 65 without making the FBS unit 3 larger.

Still further, since the stopper 90 is a flat-shaped member broad in the height direction of the device, the width of the device necessary for arranging the stopper 90 and the stopper accommodating portion 68 is made smaller. Thus, the device can be made smaller.

In addition, since the stopper 90 is provided with a rib 95 for expanding the bottom face, the stopper 90 can be increased in rigidity. In addition, even where a user has his/her hand pinched between the stopper 90 and the printer unit 2 when the stopper 90 lays down, a force per unit area applied to the hand of the user is reduced, thereby no great pain is caused.

In the multi-function device 1 according to the example of the present invention, the FBS unit 3 is configured to be opened and closed with respect to the printer unit 2. However, a device main body to which the FBS unit 3 is opened and closed the present invention is not restricted to the printer unit 2. Therefore, the present invention may be provided as an image scanning device not having a function as a printer.

What is claimed is:
1. An image scanning device comprising;
a main body that has a box-shaped appearance having a front face and a back face that opposes to the front face and including a first axis and a second axis, wherein the first axis is perpendicular to the second axis;
a flat bed scanner unit that is mounted on the main body to be rotatable around an axis provided near the back face along the first axis of the main body, the flat bed scanner unit comprising:

an image sensor that moves parallel to the first axis and that is disposed at a predetermined height above a document scanning area to scan an image of a document placed on the document scanning area, and a casing with a stopper accommodating portion that is recessed from a bottom surface of the casing and that is disposed adjacent to the document scanning area of the image sensor when the flat bed scanner unit is in a closed state where the flat bed scanner unit is closed with respect to the main body; and a stopper that supports the flat bed scanner unit in an opened state where the flat bed scanner unit is opened with respect to the main body by being rotated around the first axis, the stopper comprising:

a base end that is rotatably attached to an upper portion of the main body; and a leading end that is slidably attached to the flat bed scanner unit, wherein the stopper accommodating portion is configured to accommodate the stopper above and substantially parallel to the bottom surface of the casing when the flat bed scanner unit is in the closed state.

2. The image scanning device according to claim 1, wherein the stopper extends along the second axis of the main body, with the base end positioned near to the front face and the leading end positioned near to the back face.

3. The image scanning device according to claim 1, wherein the stopper accommodating portion accommodates the stopper at the predetermined height at which the image sensor is disposed.

4. The image scanning device according to claim 1, wherein the stopper comprises a friction member that is disposed at the leading end, the friction member being configured to move inside and along the stopper accommodating portion, and wherein the stopper accommodating portion comprises a friction adjusting member that is configured to shift between a first posture and a second posture, the first posture being in a pressure contact with the friction member to apply a sliding friction to the friction member, the second posture being in non-pressure contact with the friction member to allow the friction member to move without receiving the sliding friction.

5. The image scanning device according to claim 4, wherein the friction adjusting member shifts to the second posture when the flat bed scanner unit opens with respect to the main body, and wherein the friction adjusting member shifts to the first posture when the flat bed scanner unit closes with respect to the main body.

6. The image scanning device according to claim 5, wherein the friction adjusting member is provided with:

a pressure contact portion that pressure contacts with the friction members wherein the pressure contact portion is provided in the stopper accommodating portion and projects therefrom; and a guide groove formed along a direction that the stopper slides, wherein the leading end of the stopper engages the guide groove, wherein the friction adjusting member projects from the stopper accommodating portion when the flat bed scanner unit opens with respect to the main body, and wherein the friction adjusting member is accommodated within the stopper accommodating portion when the flat bed scanner unit closes with respect to the main body.

7. The image scanning device according to claim 1, wherein the stopper comprises a flat surface which extends across a breadth of the flat surface and perpendicular to the first and second axes of the main body.

8. The image scanning device according to claim 7, wherein the stopper comprises a rib which extends from a bottom face of the stopper.

9. The image scanning device according to claim 7, wherein the stopper comprises a reinforcing portion that projects parallel to the breadth of the flat surface of the stopper.

10. The image scanning device according to claim 9, wherein the reinforcing portion is disposed on both of a front face and a back face of the stopper to project alternately from the front face and back face parallel to the breadth of the flat surface of the stopper.

11. The image scanning device according to claim 10, wherein the reinforcing portion projects from both of the front face and the back face perpendicular to the breadth of the flat surface of the stopper.

12. The image scanning device according to claim 1, wherein the main body comprises a printer unit for forming an image on a sheet.

* * * * *